US012036839B2

(12) United States Patent
Komatsu

(10) Patent No.: US 12,036,839 B2
(45) Date of Patent: Jul. 16, 2024

(54) WORK VEHICLE WITH ACCOMMODATION FOR AIR CONDITIONER IN REAR BEAM OF CABIN FRAME

(71) Applicant: YANMAR POWER TECHNOLOGY CO., LTD., Osaka (JP)

(72) Inventor: Masakazu Komatsu, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 258 days.

(21) Appl. No.: 16/985,517

(22) Filed: Aug. 5, 2020

(65) Prior Publication Data

US 2020/0361277 A1     Nov. 19, 2020

Related U.S. Application Data

(63) Continuation of application No. 15/409,053, filed on Jan. 18, 2017, now Pat. No. 10,766,335, which is a
(Continued)

(30) Foreign Application Priority Data

Jul. 30, 2014   (JP) .................................. 2014-155061

(51) Int. Cl.
  *B60H 1/00*   (2006.01)
  *B60H 1/02*   (2006.01)
  (Continued)

(52) U.S. Cl.
  CPC ........... *B60H 1/00378* (2013.01); *B60H 1/02* (2013.01); *B60H 1/245* (2013.01); *B60H 3/0658* (2013.01);
  (Continued)

(58) Field of Classification Search
  CPC ...... B60H 1/00378; B60H 1/02; B60H 1/245; B60H 1/0055; B60H 3/0658;
  (Continued)

(56) References Cited

U.S. PATENT DOCUMENTS 3,472,147 A    10/1969   Grasseler
3,522,839 A    8/1970   Wendt et al.
(Continued)

FOREIGN PATENT DOCUMENTS

CN    203344689 U    12/2013
CN    203727489 U    7/2014
(Continued)

OTHER PUBLICATIONS

Chinese Office Action dated Jun. 12, issued in corresponding CN application No. 201580037902.5.
(Continued)

*Primary Examiner* — Travis Ruby
(74) *Attorney, Agent, or Firm* — NORTON ROSE FULBRIGHT US LLP

(57) ABSTRACT

A work vehicle includes a cabin to cover an operator's seat on a traveling body. A cabin frame that constitutes a framework of the cabin includes a pair of left and right front pillars, a pair of left and right rear pillars, a front beam, a rear beam, and side beams. The front beam couples upper end portions of the front pillars to each other. The rear beam couples upper end portions of the rear pillars to each other. Each of the side beams couples to each other upper end portions of each of the front pillars and each of the rear pillars that stand at a front and rear. The rear beam is formed to have a U-shaped cross-section by presswork of a metal plate material.

10 Claims, 14 Drawing Sheets

Related U.S. Application Data continuation of application No. PCT/JP2015/071307, filed on Jul. 28, 2015.

(51) Int. Cl.
| | | |
|---|---|---|
| *B60H 1/24* | (2006.01) | |
| *B60H 3/06* | (2006.01) | |
| *B62D 25/04* | (2006.01) | |
| *B62D 25/06* | (2006.01) | |
| *B62D 33/06* | (2006.01) | |
| *E02F 9/16* | (2006.01) | |

(52) U.S. Cl.
CPC ............. *B62D 25/04* (2013.01); *B62D 25/06* (2013.01); *B62D 33/0617* (2013.01); *E02F 9/16* (2013.01); *B60Y 2304/03* (2013.01); *B60Y 2304/05* (2013.01); *B60Y 2306/09* (2013.01)

(58) Field of Classification Search
CPC .......... B60H 2001/00235; B62D 25/04; B62D 25/06; B62D 33/0617; B60Y 2304/03; B60Y 2306/09; E02F 9/16
See application file for complete search history.

(56) References Cited

U.S. PATENT DOCUMENTS

| | | | |
|---|---|---|---|
| 3,555,846 A | 1/1971 | Harbeck et al. | |
| 3,657,992 A | 4/1972 | Minnick, Jr. | |
| 3,868,896 A | 3/1975 | Doll et al. | |
| 4,072,487 A | 2/1978 | Irwin | |
| 4,088,364 A | 5/1978 | Termont | |
| 4,097,085 A | 6/1978 | Nelson | |
| 4,120,527 A | 10/1978 | Lawrence | |
| 4,140,047 A | 2/1979 | Bowman et al. | |
| 4,189,987 A | 2/1980 | Amberg et al. | |
| 4,492,151 A | 1/1985 | Mattei | |
| 4,503,749 A | 3/1985 | Kuhn et al. | |
| 4,648,311 A | 3/1987 | Slosiarek et al. | |
| 4,660,462 A | 4/1987 | Thompson et al. | |
| 4,684,381 A | 8/1987 | Wasylyniuk | |
| 4,709,623 A | 12/1987 | Roth et al. | |
| 4,721,031 A | 1/1988 | Nakata et al. | |
| 4,784,048 A | 11/1988 | Nelson | |
| 5,086,858 A * | 2/1992 | Mizuta .................. | B60K 13/06 |
| | | | 55/385.3 |
| 5,595,239 A | 1/1997 | Wolf et al. | |
| 5,695,238 A | 12/1997 | Calamari et al. | |
| 5,906,411 A | 5/1999 | Stauffer et al. | |
| 5,913,566 A | 6/1999 | Stauffer et al. | |
| 5,921,619 A | 7/1999 | Cederberg et al. | |
| 6,279,978 B1 | 8/2001 | Schreyer et al. | |
| 6,322,136 B2 | 11/2001 | Boyce et al. | |
| 6,780,097 B2 | 8/2004 | Shuttleworth et al. | |
| 7,252,585 B2 | 8/2007 | Ichikawa et al. | |
| 7,334,834 B2 | 2/2008 | Hill et al. | |
| 7,338,357 B2 | 3/2008 | Hugh et al. | |
| 7,377,848 B2 | 5/2008 | Voit, II et al. | |
| 7,413,243 B2 * | 8/2008 | Droulez ............... | B60H 1/0055 |
| | | | 296/193.02 |
| 7,484,793 B2 | 2/2009 | Baro et al. | |
| 8,033,899 B2 | 10/2011 | Ichikawa et al. | |
| 8,371,408 B2 | 2/2013 | Kawashiri et al. | |
| 8,376,820 B2 * | 2/2013 | Stough ................ | B60H 3/0641 |
| | | | 454/158 |
| 8,403,734 B2 | 3/2013 | Bruss | |
| 8,485,589 B2 | 7/2013 | Obe et al. | |
| 8,985,263 B2 | 3/2015 | Peterson et al. | |
| 9,045,028 B2 | 6/2015 | Ichikawa | |
| 9,139,979 B2 * | 9/2015 | Nagami .................... | E02F 9/16 |
| 9,316,338 B2 * | 4/2016 | Doi .......................... | F16L 55/09 |
| 2003/0173132 A1 | 9/2003 | Komatsu et al. | |
| 2005/0005532 A1 | 1/2005 | Ichikawa et al. | |
| 2005/0087332 A1 | 4/2005 | Umeo et al. | |
| 2005/0092479 A1 | 5/2005 | Umeo et al. | |
| 2006/0006696 A1 | 1/2006 | Umemoto | |
| 2007/0044492 A1 | 3/2007 | Ichikawa et al. | |
| 2007/0205633 A1 | 9/2007 | Waco et al. | |
| 2007/0210618 A1 | 9/2007 | Hill et al. | |
| 2008/0014856 A1 | 1/2008 | Voit et al. | |
| 2008/0252102 A1 | 10/2008 | Fukunaga et al. | |
| 2010/0164251 A1 | 7/2010 | Itou | |
| 2011/0316309 A1 | 12/2011 | Kawashiri | |
| 2012/0247846 A1 | 10/2012 | Ichikawa | |
| 2013/0139921 A1 | 6/2013 | Doi et al. | |
| 2014/0292035 A1 | 10/2014 | Doi et al. | |
| 2016/0114838 A1 | 4/2016 | Salvini | |
| 2016/0167476 A1 | 6/2016 | Kawashiri et al. | |
| 2016/0311288 A1 | 10/2016 | Mayo Mayo et al. | |
| 2016/0375741 A1 | 12/2016 | Thompson et al. | |
| 2016/0375941 A1 | 12/2016 | Thompson et al. | |
| 2017/0015368 A1 | 1/2017 | Miyazaki | |
| 2017/0101134 A1 | 4/2017 | Miyazaki | |
| 2017/0210195 A1 | 7/2017 | Falagario et al. | |
| 2017/0218832 A1 | 8/2017 | Kurokawa et al. | |
| 2017/0240021 A1 | 8/2017 | Frazier et al. | |
| 2018/0134115 A1 | 5/2018 | Shimada | |

FOREIGN PATENT DOCUMENTS

| | | |
|---|---|---|
| EP | 2380803 A1 | 10/2011 |
| JP | H11-091641 A | 4/1999 |
| JP | 2002-067657 A | 3/2002 |
| JP | 2002-068026 A | 3/2002 |
| JP | 2004-203279 A | 7/2004 |
| JP | 2004-345367 A | 12/2004 |
| JP | 2005-145335 A | 6/2005 |
| JP | 2007-308030 A | 11/2007 |
| JP | 2003175860 A | 6/2013 |
| KR | 10-2007-0025932 A | 3/2007 |

OTHER PUBLICATIONS

European Search Report dated Jul. 17, 2017 issued in corresponding EP Application 15827673.3.

Korean Office Action dated Jun. 22, 2020 issued in corresponding Korean Application No. 10-2016-7034191.

* cited by examiner

WORK VEHICLE WITH ACCOMMODATION FOR AIR CONDITIONER IN REAR BEAM OF CABIN FRAME

CROSS REFERENCE TO RELATED APPLICATIONS

The present application is a continuation of U.S. application Ser. No. 15/409,053 filed Jan. 18, 2017, which is a continuation of International Application No. PCT/JP2015/071307, filed Jul. 28, 2015, which claims priority to Japanese Patent Application No. 2014-155061, filed Jul. 30, 2014. The contents of these applications are incorporated herein by reference in their entirety.

DESCRIPTION

Technical Field

The present invention relates to a work vehicle.

Background Art

Conventionally, a work vehicle such as an agricultural tractor includes a cabin that covers an operator's seat on a traveling body (see Japanese Unexamined Patent Application Publication No. 2002-67657 and Japanese Unexamined Patent Application Publication No. 2004-345367, for example). A cabin disclosed in these patent documents includes a cabin frame and a roof body. The cabin frame constitutes a framework. The roof body is disposed on an upper end side of the cabin frame. The cabin frame has what is called a frame structure in which pillars and beams are combined. The pillars and the beams make the cabin frame secure rigidity.

Concerning a configuration of this kind of cabin, there is a strong demand for not only cost reduction but also improving an operator's readiness to get into the cabin and comfort inside of the cabin. There is a need for making farm work comfortable by, for example, controlling air conditioning inside of the cabin and reducing noise in the cabin.

In this kind of work vehicle, the pillars and the beams are made of square pipe material to secure their strength. This improves rigidity of the cabin frame. At the same time, however, this also increases the cost. Consequently, there was a problem of not satisfying the demand for cost reduction that has been increasing recently.

It is a technical object of the present invention to provide a work vehicle improved in view of the above-described present circumstances.

SUMMARY OF THE INVENTION

According to a first aspect of the invention, in a work vehicle including a cabin to cover an operator's seat on a traveling body, a cabin frame that constitutes a framework of the cabin includes a pair of left and right front pillars, a pair of left and right rear pillars, a front beam, a rear beam, and side beams. The front beam couples upper end portions of the front pillars to each other. The rear beam couples upper end portions of the rear pillars to each other. Each of the side beams couples to each other upper end portions of each of the front pillars and each of the rear pillars that stand at a front and rear. The rear beam is formed to have a U-shaped cross-section by presswork of a metal plate material.

According to a second aspect of the invention, in the work vehicle according to the first aspect of the invention, the rear beam may protrudes more rearward than both of the rear pillars to accommodate an air conditioner inside of the rear beam.

According to a third aspect of the invention, in the work vehicle according to the first aspect of the invention, a roof body may be disposed on an upper end side of the cabin frame, and discharge ducts configured to discharge conditioned air from the air conditioner into the cabin may be disposed separately on left and right side portions of the roof body.

According to a fourth aspect of the invention, in the work vehicle according to the third aspect of the invention, the left and right discharge ducts and an intake duct configured to take in outside air may be separately arranged in upper and lower inside portions of the roof body.

According to a fifth aspect of the invention, in the work vehicle according to the fourth aspect of the invention, the intake duct may be disposed above both of the discharge ducts inside of the roof body. Outside air intake holes configured to allow the intake duct to communicate with an outside may be formed in both of left and right side portions of the roof body. Outside air filters may be respectively attached to the outside air intake holes.

According to a sixth aspect of the invention, in the work vehicle according to the second aspect of the invention, both of left and right side portions of a seat frame body of the cabin frame configured to support the operator's seat may be formed to have an uneven cross-section by presswork.

According to a seventh aspect of the invention, in the work vehicle according to the sixth aspect of the invention, a rear surface portion of the seat frame body may be formed to have an uneven cross-section by presswork, and both of the left and right side portions of the seat frame body may be coupled to the rear surface portion.

According to the embodiment of the present invention, in the work vehicle including the cabin to cover the operator's seat on the traveling body, the cabin frame that constitutes the framework of the cabin includes the pair of left and right front pillars, the pair of left and right rear pillars, the front beam, the rear beam, and the side beams. The front beam couples the upper end portions of the front pillars to each other. The rear beam couples the upper end portions of the rear pillars to each other. Each of the side beams couples to each other the upper end portions of each of the front pillars and each of the rear pillars that stand at the front and rear. The rear beam is formed to have the U-shaped cross-section by presswork of the metal plate material. This improves rigidity of the rear beam without using a pipe material, for example, and also reduces a weight of the rear beam.

According to the embodiment of the invention of the second aspect, the rear beam protrudes more rearward than both of the rear pillars to accommodate the air conditioner inside of the rear beam. Consequently, without increasing an overall height of the cabin, the air conditioner can be disposed inside of the roof body. It is also possible to avoid a problem that if the air conditioner is accommodated at the front side of the roof body, for example, the air conditioner may block an operator's front field of vision. Moreover, since the air conditioner is accommodated inside of the rear beam, it is possible to reduce an installation space of the air conditioner.

According to the embodiment of the invention of the third aspect, the roof body is disposed on the upper end side of the cabin frame, and the discharge ducts configured to discharge conditioned air from the air conditioner into the cabin are disposed separately on the left and right side portions of the roof body. Consequently, the air conditioner, which is located at the rear, provides a larger space in a front upper portion of the cabin. This improves front visibility of the cabin. Since a space is provided at the front of the roof body, an installation position of a sunroof, for example, can be readily secured.

According to the embodiment of the invention of the fourth aspect, the left and right discharge ducts and the intake duct configured to take in the outside air are separately arranged in the upper and lower inside portions of the roof body. Consequently, the left and right discharge ducts and the intake duct are arranged at two upper and lower stages to reduce a space for installing a group of the ducts inside of the roof body.

According to the embodiment of the invention of the fifth aspect, the intake duct is disposed above both of the discharge ducts inside of the roof body. The outside air intake holes configured to allow the intake duct to communicate with the outside are formed in both of the left and right side portions of the roof body. The outside air filters are respectively attached to the outside air intake holes. Consequently, the left and right side portions of the roof body, which are dead space, are utilized effectively to dispose the outside air filters in compact arrangement.

According to the embodiment of the invention of the sixth aspect, both of the left and right side portions of the seat frame body of the cabin frame configured to support the operator's seat are formed to have the uneven cross-section by presswork. This increases the modulus of section of the left and right side portions of the seat frame body to improve rigidity of the seat frame body and thus rigidity of the cabin frame. A conventional pipe frame extending in the fore and aft direction is no longer necessary.

According to the embodiment of the invention of the seventh aspect, the rear surface portion of the seat frame body is formed to have the uneven cross-section by presswork, and both of the left and right side portions of the seat frame body are coupled to the rear surface portion. This increases the modulus of section of the seat frame body as a whole, and the seat frame body can solely constitute a structure. This in turn contributes to improvement of rigidity of the whole cabin frame.

EMBODIMENTS OF THE INVENTION

Figure 1:
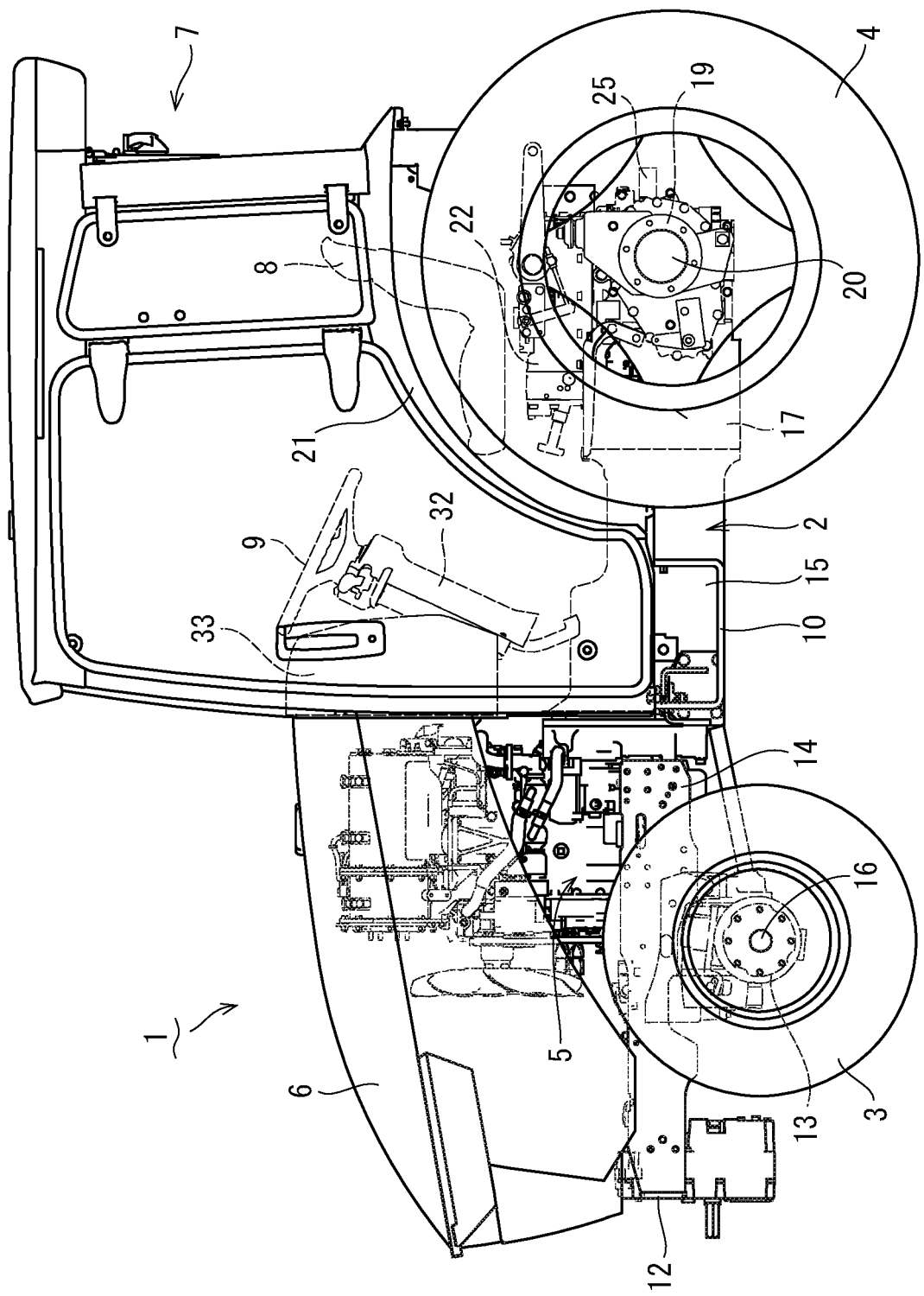
FIG. 1 is a left side view of a tractor.

An embodiment of the present invention will be described below with reference to the drawings. A tractor as a work vehicle will be taken as an example.

First, by referring to FIGS. 1 and 2, an outline of a tractor 1 will be described. A traveling body 2 of the tractor 1 in the embodiment is supported by a pair of left and right front wheels 3 and a pair of left and right rear wheels 4, which serve as a traveling portion. A common-rail diesel engine 5 (hereinafter simply referred to as engine) serving as a motive power source is mounted on a front portion of the traveling body 2. The rear wheels 4 and the front wheels 3 are driven by the engine 5 to make the tractor 1 travel forward and backward. The engine 5 is covered with a hood 6. A cabin 7 is disposed on an upper surface of the traveling body 2. Inside of the cabin 7, an operator's seat 8 and a steering wheel 9 are disposed. The steering wheel 9 is turned to move a steering direction of the front wheels 3 to the left and right. In this case, a steering column 32 is disposed in front of the operator's seat 8 in the cabin 7. The steering column 32 stands and is embedded on a rear surface side of a dashboard 33 disposed at the front in the cabin 7. The steering wheel 9, which has an approximately circular shape in a plan view, is attached to an upper end side of a wheel shaft that upwardly protrudes from an upper surface of the steering column 32. A step 10 for an operator to step on when getting into and out of the cabin 7 is disposed on either of left and right lower portions of the cabin 7.

The traveling body 2 includes an engine frame 14, a clutch housing 15, and a transmission case 17. The engine frame 14 includes a front bumper 12 and front axle cases 13. The clutch housing 15 is coupled to a rear surface side of the engine 5. The transmission case 17 is coupled to a rear surface side of the clutch housing 15. A rear end side of the engine frame 14 is coupled to left and right outer surfaces of the engine 5. Front axles 16 rotatably protrude outward from both of a left end side of the left front axle case 13 and a right end side of the right front axle case 13. The front wheels 3 are attached to both of the left end side of the left front axle case 13 and the right end side of the right front axle case 13 through the front axles 16. The transmission case 17 suitably changes a speed of rotary motive power of the engine 5 and transmits the rotary motive power to the four front and rear wheels 3, 3, 4, and 4. Left and right rear axle cases 19 are attached to and protrude outward from left and right outer surfaces of the transmission case 17. Left and right rear axles 20 are rotatably inserted in the left and right axle cases 19. The rear wheels 4 are attached to the transmission case 17 through the rear axles 20. Upper sides of the left and right rear wheels 4 are covered with left and right rear fenders 21.

A hydraulic elevation mechanism 22 is detachably attached to an upper surface of a rear portion of the transmission case 17. The hydraulic elevation mechanism 22 elevates and lowers a work machine such as a rotary tiller. Although not elaborated here, the work machine such as the rotary tiller is coupled to a rear portion of the transmission case 17 through a three-point link mechanism including a pair of left and right lower links and a top link. A PTO shaft 25 protrude rearward from a rear side surface of the transmission case 17. The PTO shaft 25 transmits PTO drive force to the work machine such as the rotary tiller.

Figure 7:
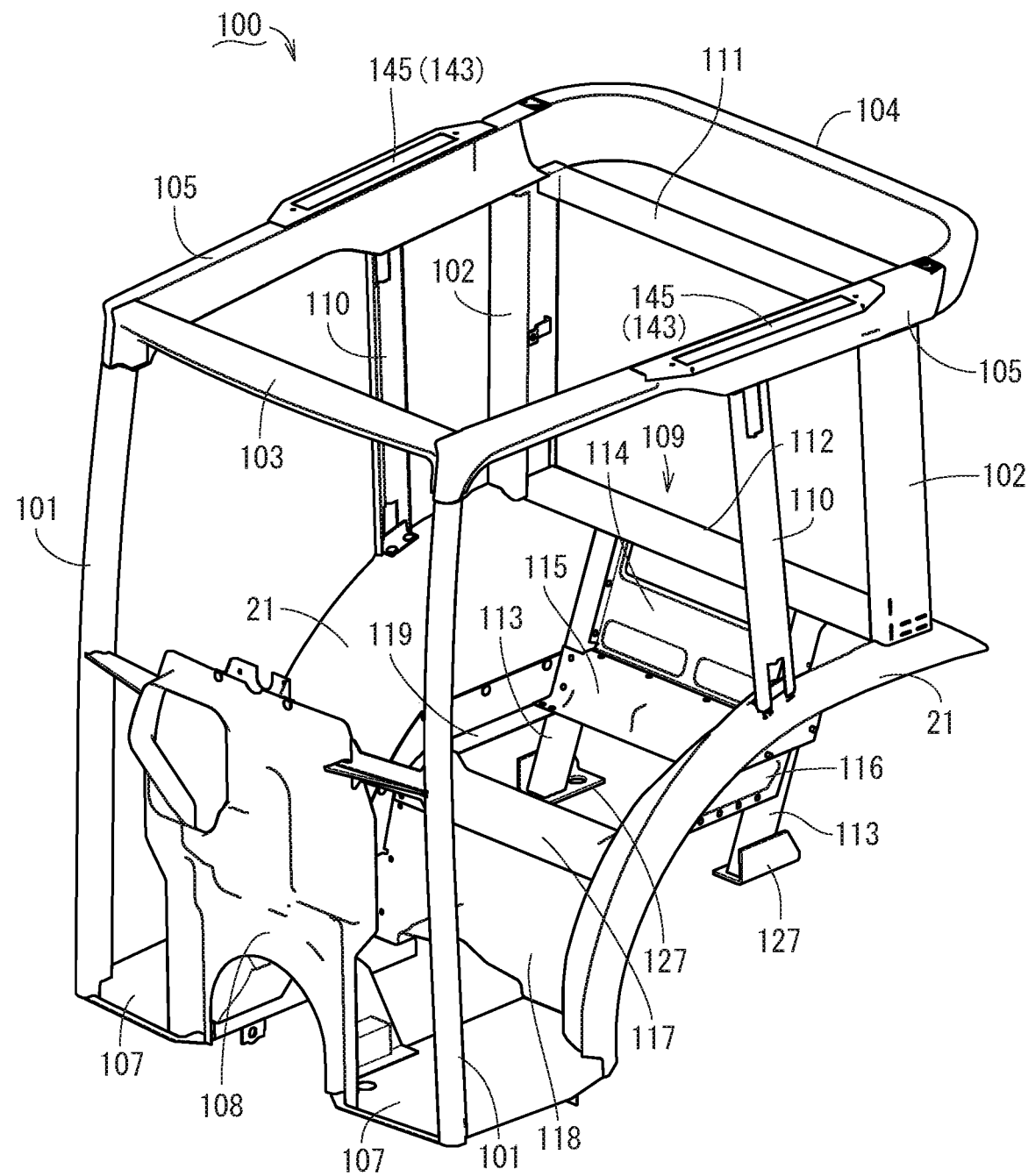
FIG. 7 is a front perspective view of a cabin frame, as viewed from a left upper side.
Figure 8:
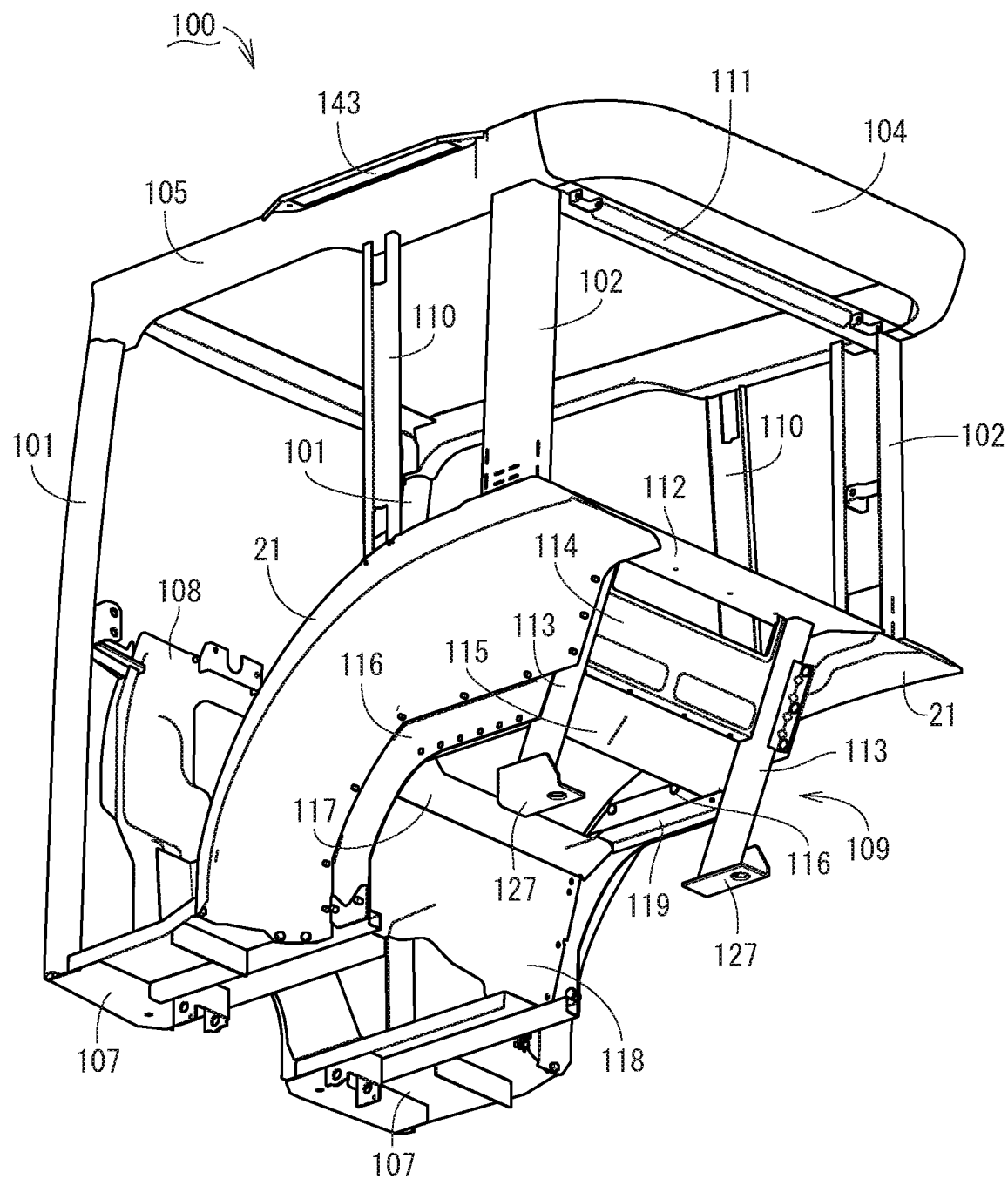
FIG. 8 is a rear perspective view of the cabin frame, as viewed from a left lower side.

A flywheel 26 is directly coupled to an engine output shaft (not illustrated) that protrudes rearward from a rear side surface of the engine 5. Through a motive power transmission shaft 29 including universal shaft joints on both ends, a main drive shaft 27 that protrudes rearward from the flywheel 26 is coupled to a main speed-change input shaft 28 that protrudes forward from a front surface side of the transmission case 17 (see FIGS. 1, 7, and 10). A hydraulic continuously-variable transmission, a forward-reverse switch mechanism, a traveling auxiliary speed-change gear mechanism, and a rear-wheel differential gear mechanism are disposed in the transmission case 17. Through the main drive shaft 27 and the motive power transmission shaft 29, rotary motive power of the engine 5 is transmitted to the main speed-change input shaft 28 of the transmission case 17, and its speed is suitably changed by the hydraulic continuously-variable transmission and the traveling auxiliary speed-change gear mechanism. Then, the motive power changed in speed is transmitted to the left and right rear wheels 4 through the rear-wheel differential gear mechanism.

A front-wheel transmission shaft (not illustrated) protrudes rearward from each of the front-wheel axle cases 13 that contains a front-wheel differential gear mechanism (not illustrated). The front-wheel transmission shaft is coupled to a front-wheel output shaft 30 protruding forward from a lower portion of a front surface of the transmission case 17 through a front-wheel drive shaft 31. The motive power changed in speed by the hydraulic continuously-variable transmission and the traveling auxiliary speed-change gear mechanism in the transmission case 17 is transmitted to each of the left and right front wheels 3 through the front-wheel output shaft 30, the front-wheel drive shaft 31, the front-wheel transmission shaft, and the front-wheel differential gear mechanism in the front axle case 13.

Next, by referring to FIGS. 3 to 10, a detailed configuration of the cabin 7 will be described. The cabin 7, which covers the operator's seat 8 on the traveling body 2, includes a cabin frame 100 that constitutes a framework. The cabin frame 100 has an approximate box frame shape including a pair of left and right front pillars 101, a pair of left and right rear pillars 102, a front beam 103, a rear beam 104, and left and right side beams 105. The front pillars 101 are located at the front of the operator's seat 8. The rear pillars 102 are located at the rear of the operator's seat 8. The front beam 103 couples upper end portions of the front pillars 101 to each other. The rear beam 104 couples upper end portions of the rear pillars 102 to each other. Each of the left and right side beams 105 couples to each other upper end portions of each of the front pillars 101 and each of the rear pillars 102 that stand at the front and rear. A roof body 106 is detachably attached to an upper end side of the cabin frame 100, namely, on a rectangular frame of the front beam 103, the rear beam 104, and the left and right side beams 105.

The rear beam 104 in the embodiment is formed to have a U-shaped cross-section (groove shape) by presswork of a metal plate material. As a whole, the rear beam 104 has an approximate U-shape in a plan view that protrudes (expands) more rearward than the left and right rear pillars 102. Consequently, an inner surface side of the rear beam 104 is opened forward. This makes it possible to improve rigidity of the rear beam 104 without using a pipe material, for example, and also reduce a weight of the rear beam 104. A laterally elongated reinforcement beam 111 is disposed between left and right end portions of the rear beam 104 that extend forward. Left and right end portions of the reinforcement beam 111 are coupled to opened lower portions of the corresponding left and right end portions of the rear beam 104. Consequently, the rear beam 104 and the reinforcement beam 111 have a rectangular frame shape in a plan view.

Left and right outer end sides of front lower plates 107 are coupled to lower end sides of the front pillars 101, and the front lower plates 107 extend laterally inward. A vertically elongated board support plate 108 is coupled to inner end sides of the left and right front lower plates 107. The board support plate 108 secures and supports the dashboard 33. The board support plate 108 stands between the left and right front pillars 101. A floorboard is extended across the left and right front lower plates 107. Upper portions of rear ends of the rear fenders 21 are coupled to lower end sides of the respective rear pillars 102. The rear fenders 21 are expanded along inner surfaces of front portions of the rear wheels 4. Lower portions of front ends of the respective rear fenders 21 are coupled to rear end sides of the left and right front lower plates 107. A seat frame body 109 having a shape like stairs in a side view is attached to lower end portions of the left and right rear pillars 102 and the left and right rear fenders 21. The operator's seat 8 is disposed on the seat frame body 109. An intermediate pillar 110 stands between the left front pillar 101 and the left rear pillar 102, and an intermediate pillar 110 stands between the right front pillar 101 and the right rear pillar 102. An upper end side of each of the intermediate pillars 110 is coupled to a longitudinally intermediate portion of each of the corresponding left and right side beams 105. A lower end side of each of the intermediate pillars 110 is coupled to a longitudinally intermediate portion of each of the corresponding left and right rear fenders 21.

A front glass sheet 121 is disposed on a front surface side of the cabin frame 100, namely, in an area surrounded by the left and right front pillars 101, the front beam 103, and the left and right front lower plates 107. A rear glass sheet 122 is disposed on a rear surface side of the cabin frame 100, namely, in an area surrounded by the left and right rear pillars 102, the rear beam 104, and the seat frame body 109. A side door 123 made of transparent glass and a side glass sheet 125 are disposed on each of left and right sides of the cabin frame 100 at the front and rear. Each of the side doors 123 is located between the front pillar 101 and the intermediate pillar 110. Each of the side doors 123 is attached to the corresponding intermediate pillar 110 through a pair of upper and lower hinges 124 so as to be openable. Each of the side glass sheets 125 are located between the intermediate pillar 110 and the rear pillar 102, and attached to the corresponding rear pillar 102 through a pair of upper and lower hinges 126 so as to be openable.

Figure 2:
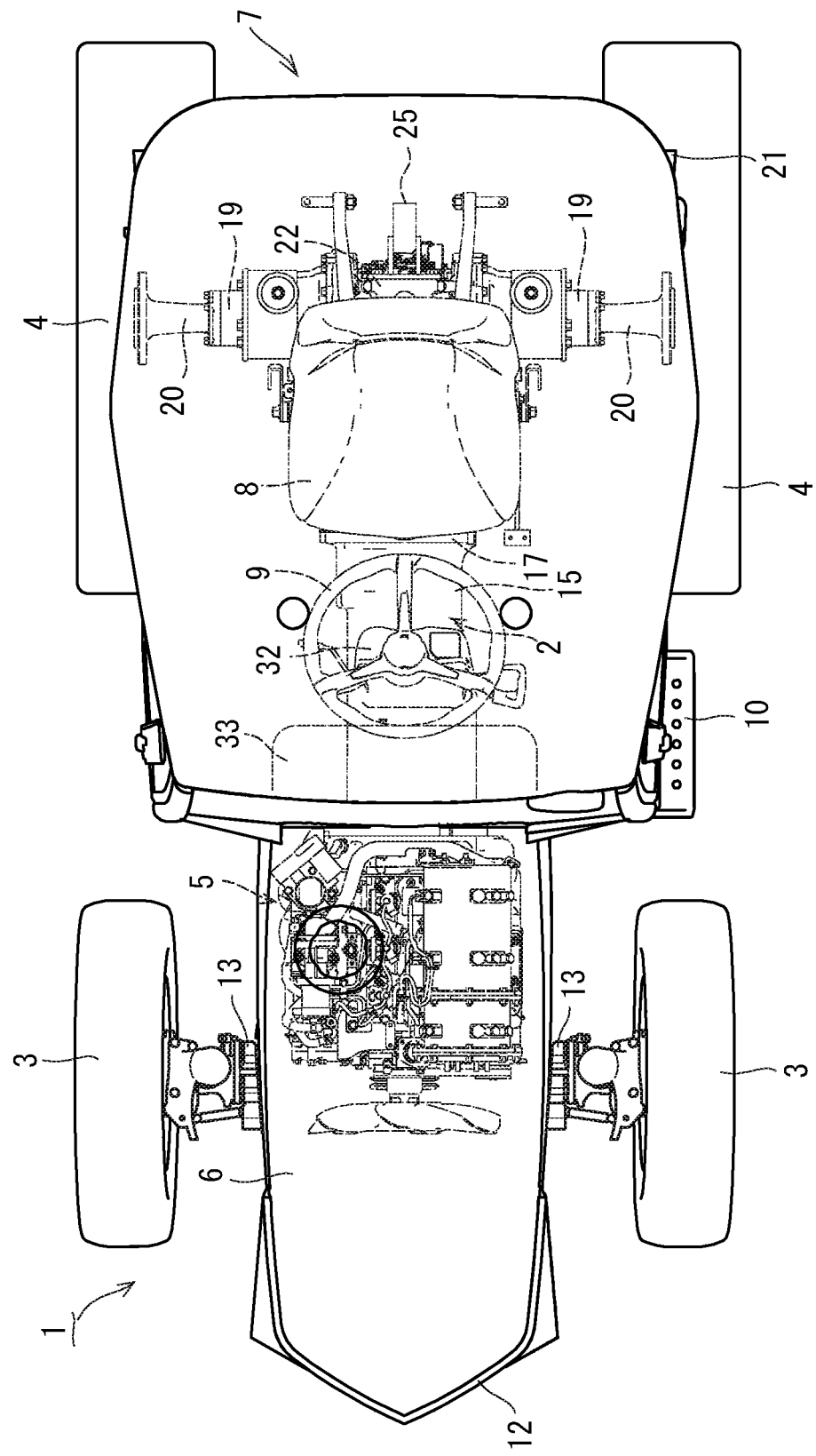
FIG. 2 is a plan view of the tractor.
Figure 3:
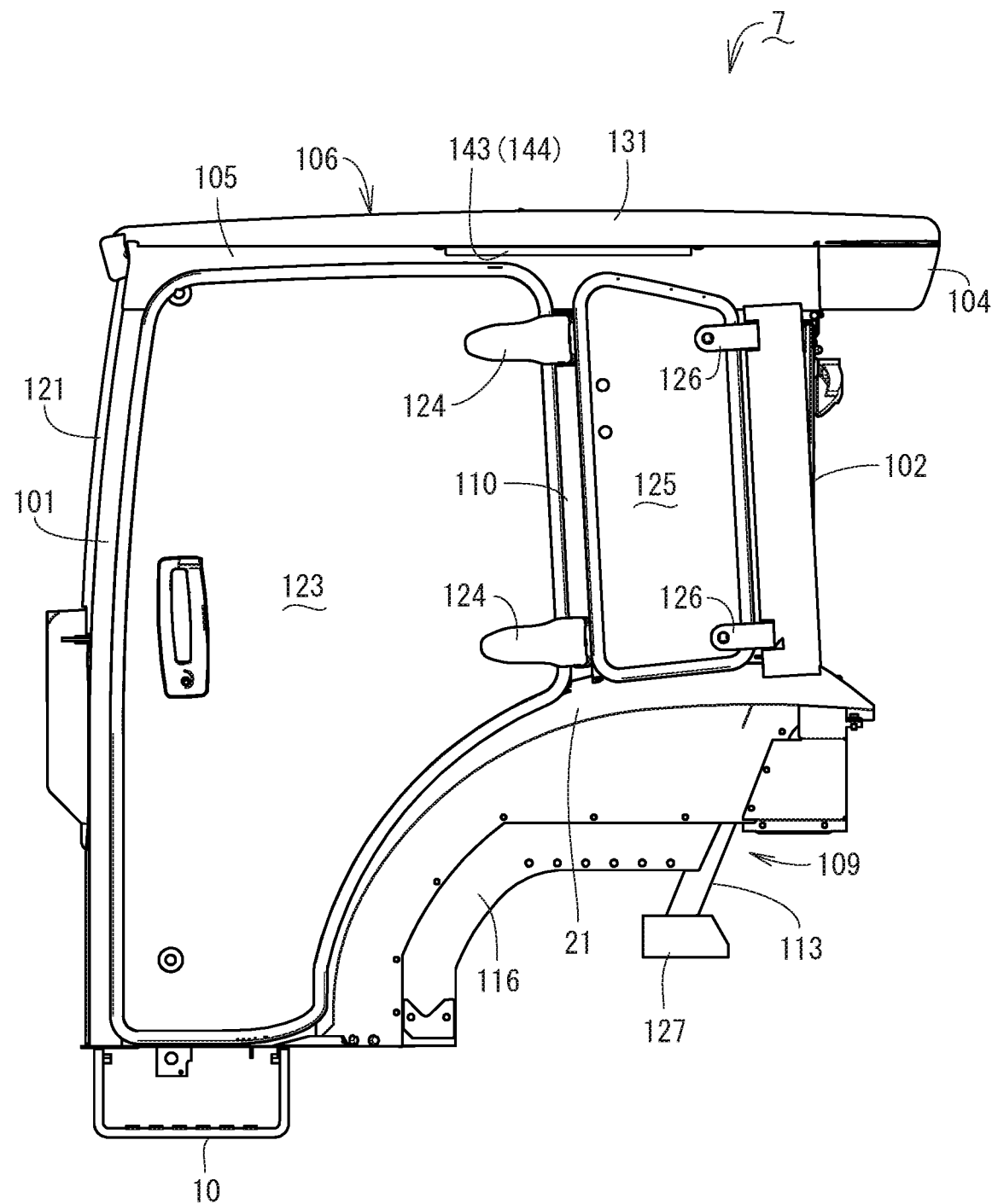
FIG. 3 is a left side view of a cabin.
Figure 4:
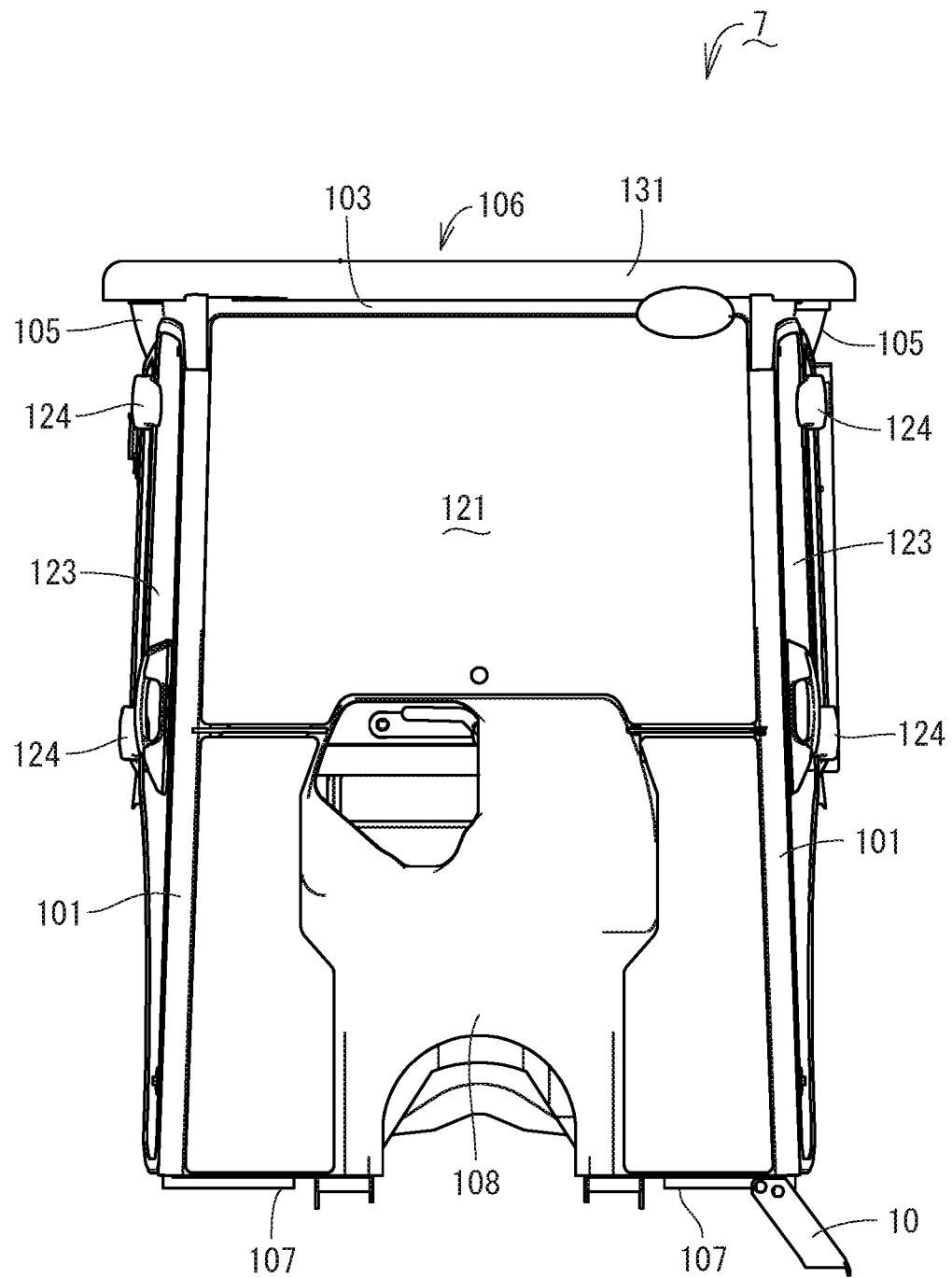
FIG. 4 is a front view of the cabin.
Figure 5:
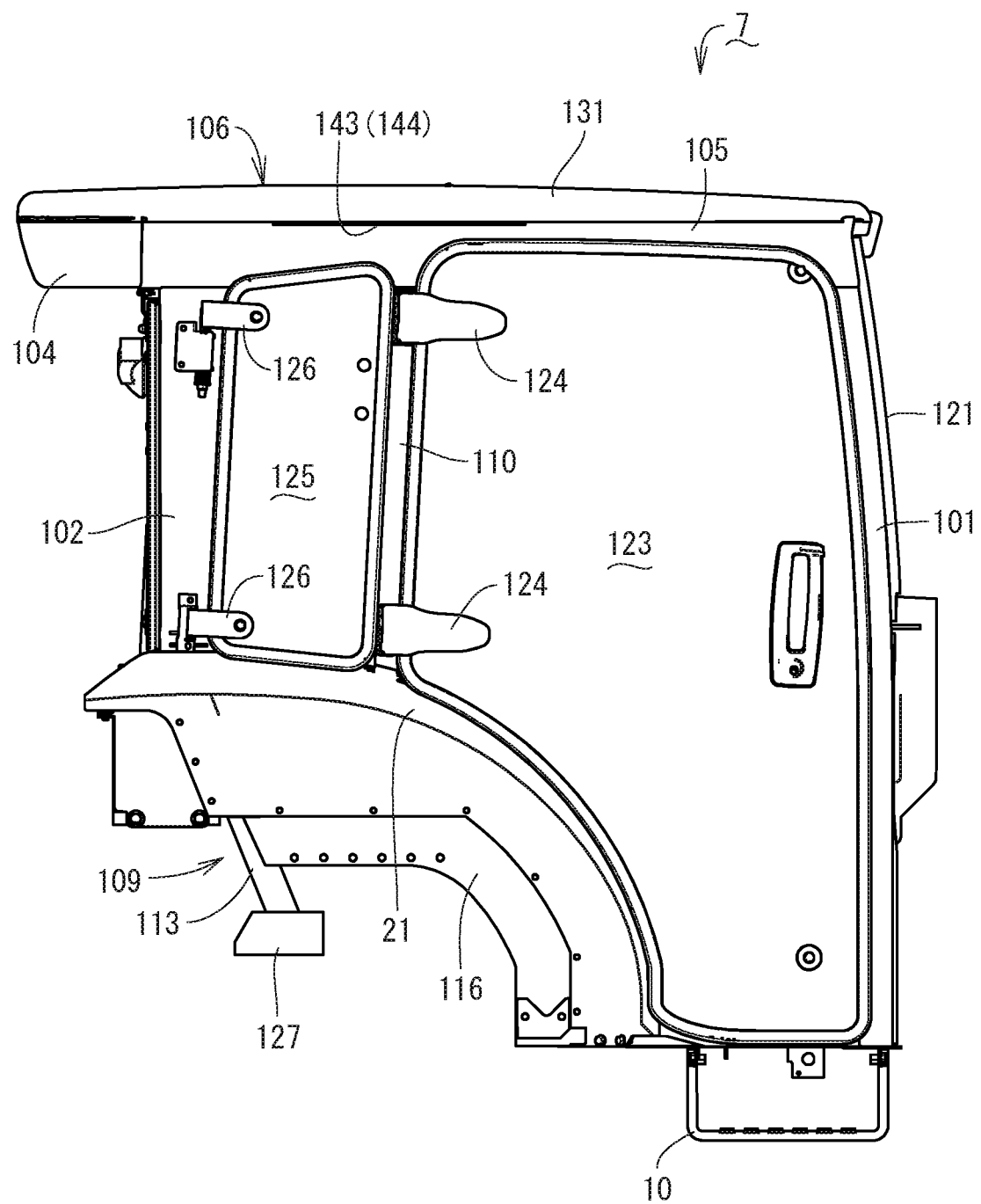
FIG. 5 is a right side view of the cabin.
Figure 6:
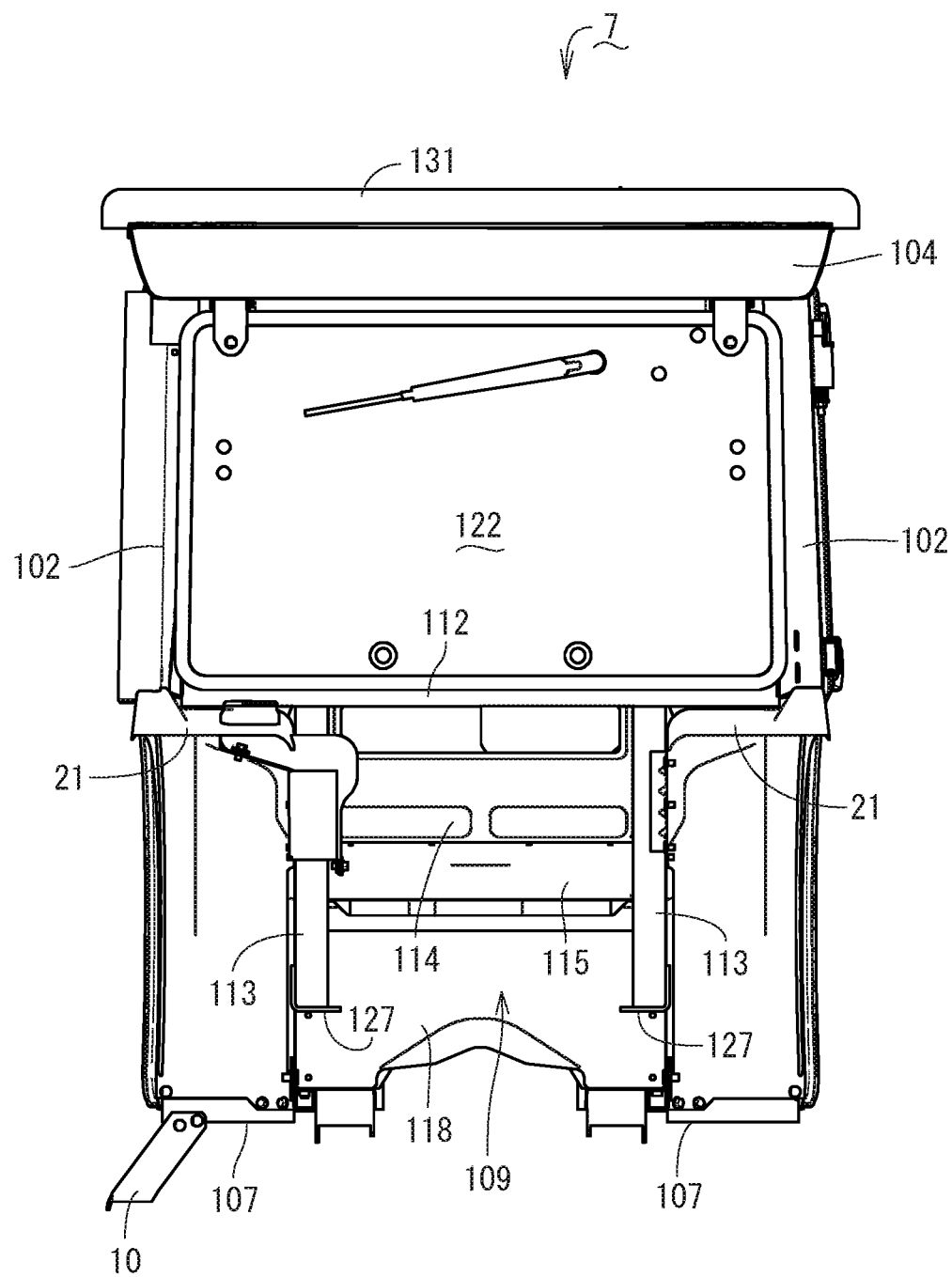
FIG. 6 is a rear view of the cabin.

Front sides of the left and right front lower plates 107 are coupled to front supports 96 attached to left and right side surfaces of the clutch housing 15 through front rubber vibration isolators 98 as a vibration isolating member (see FIG. 1). A pair of left and right base brackets 127 are disposed on lower portions of rear ends of the seat frame body 109 and extended rearward. The base brackets 127 are coupled to rear supports 97 attached to the left and right rear axle cases 19 through rear rubber vibration isolators 99 as a vibration isolating member. Thus, the traveling body 2 supports the cabin 7 through a plurality of rubber vibration isolators 98 and 99 to isolate vibration.

Figure 9:
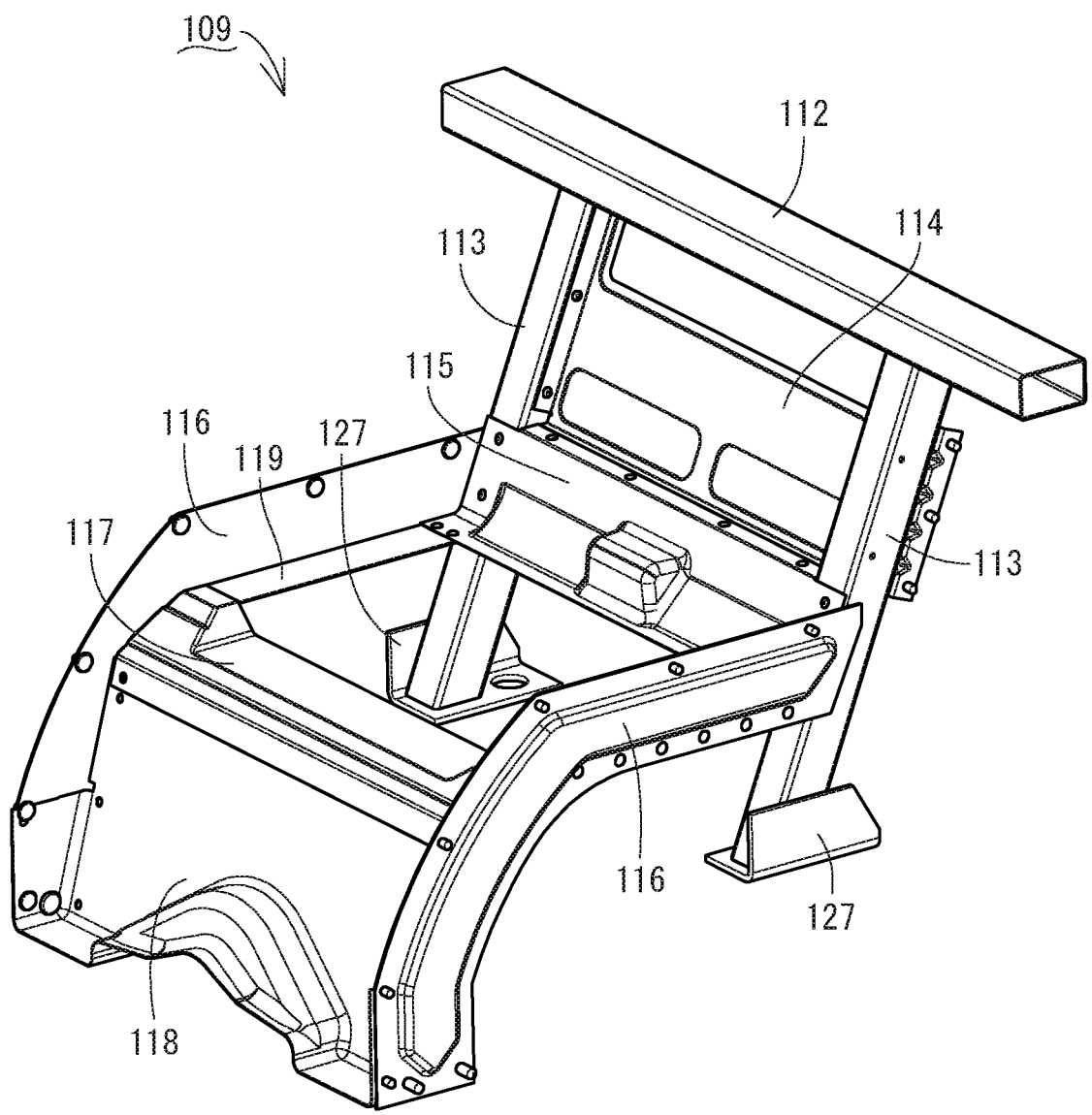
FIG. 9 is a front perspective view of a seat frame body, as viewed from a left upper side.
Figure 10:
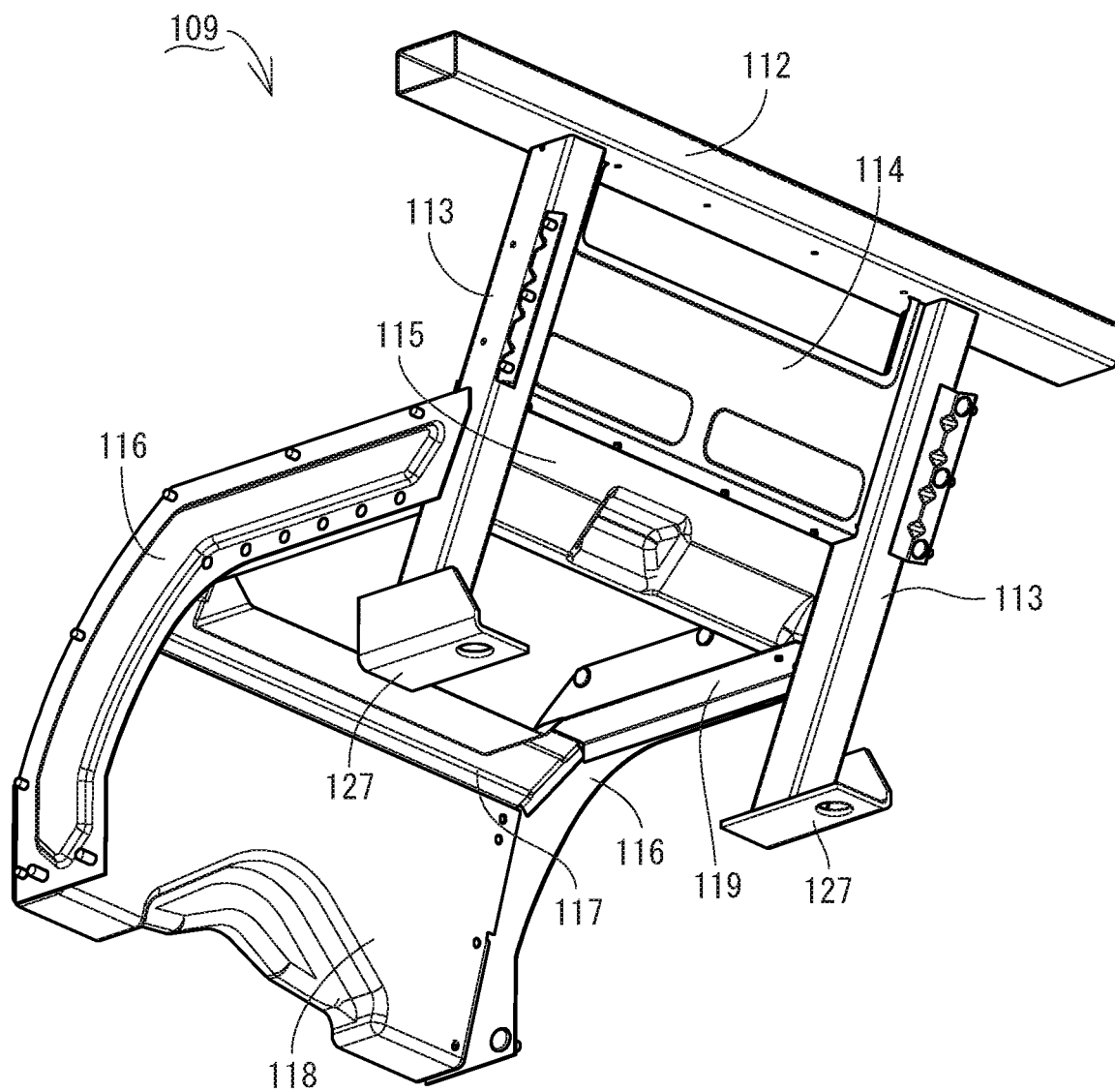
FIG. 10 is a rear perspective view of the seat frame body, as viewed from a left lower side.
Figure 11:
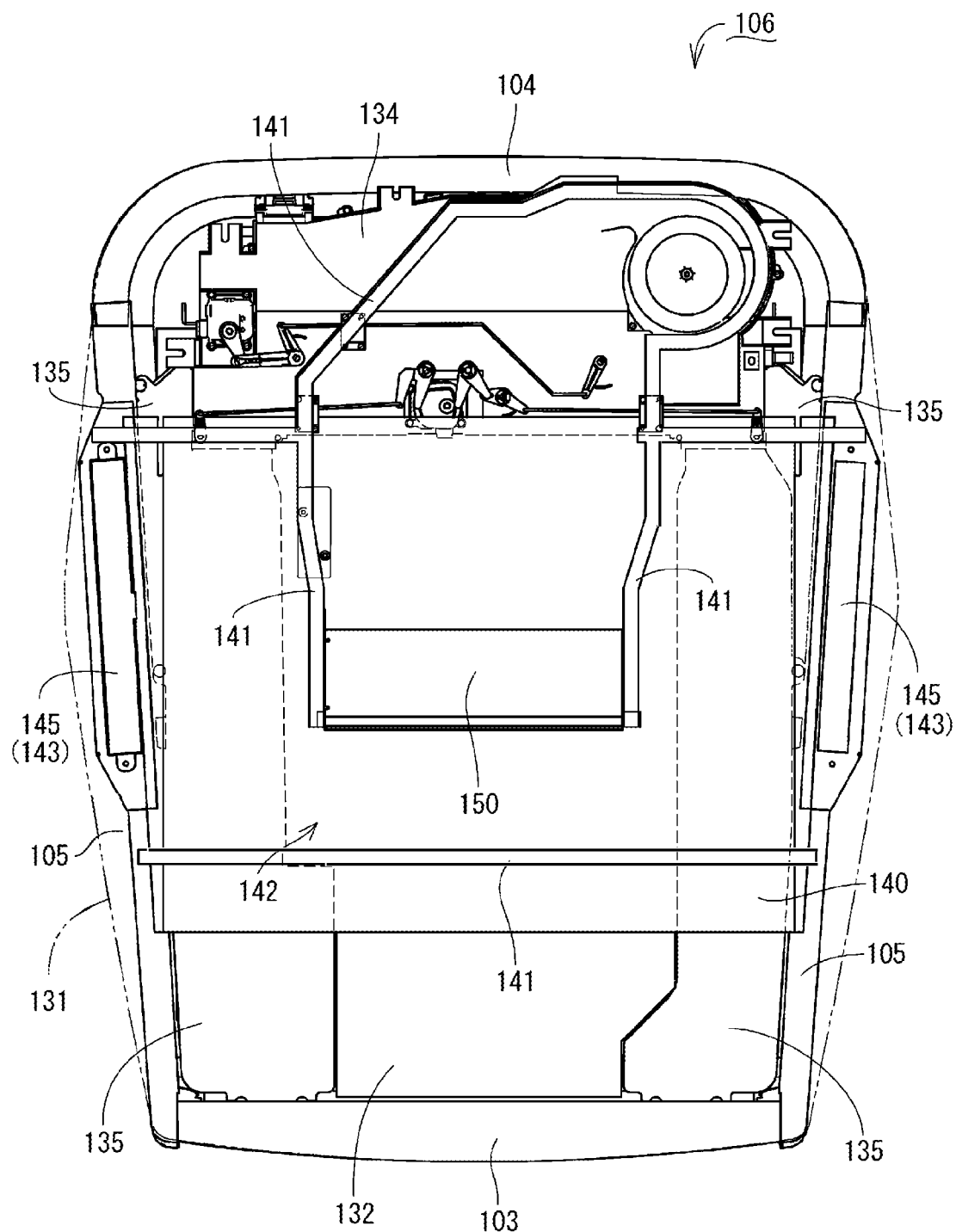
FIG. 11 is a plan view of a roof body without an outer roof.
Figure 12:
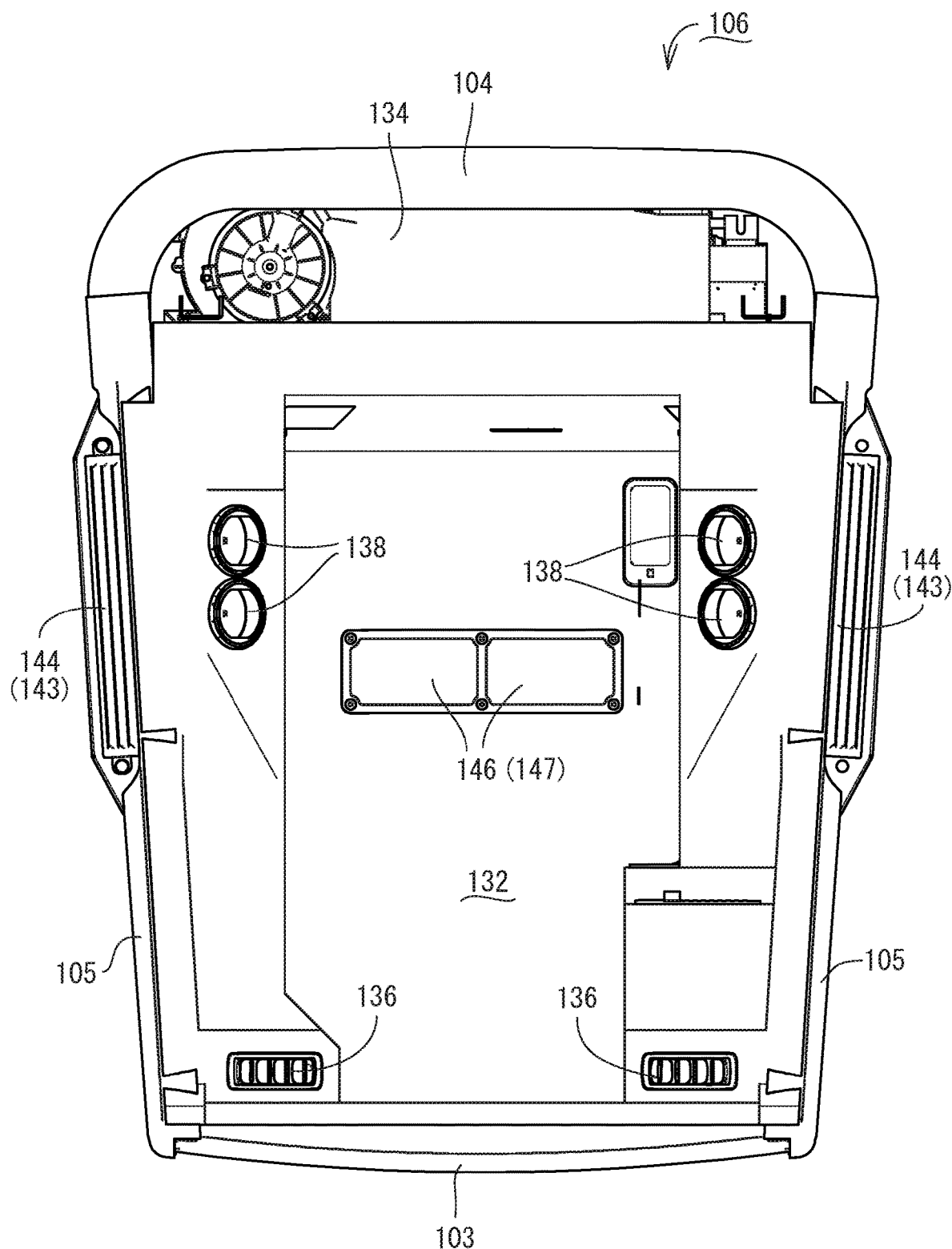
FIG. 12 is a bottom view of an inner roof.
Figure 13:
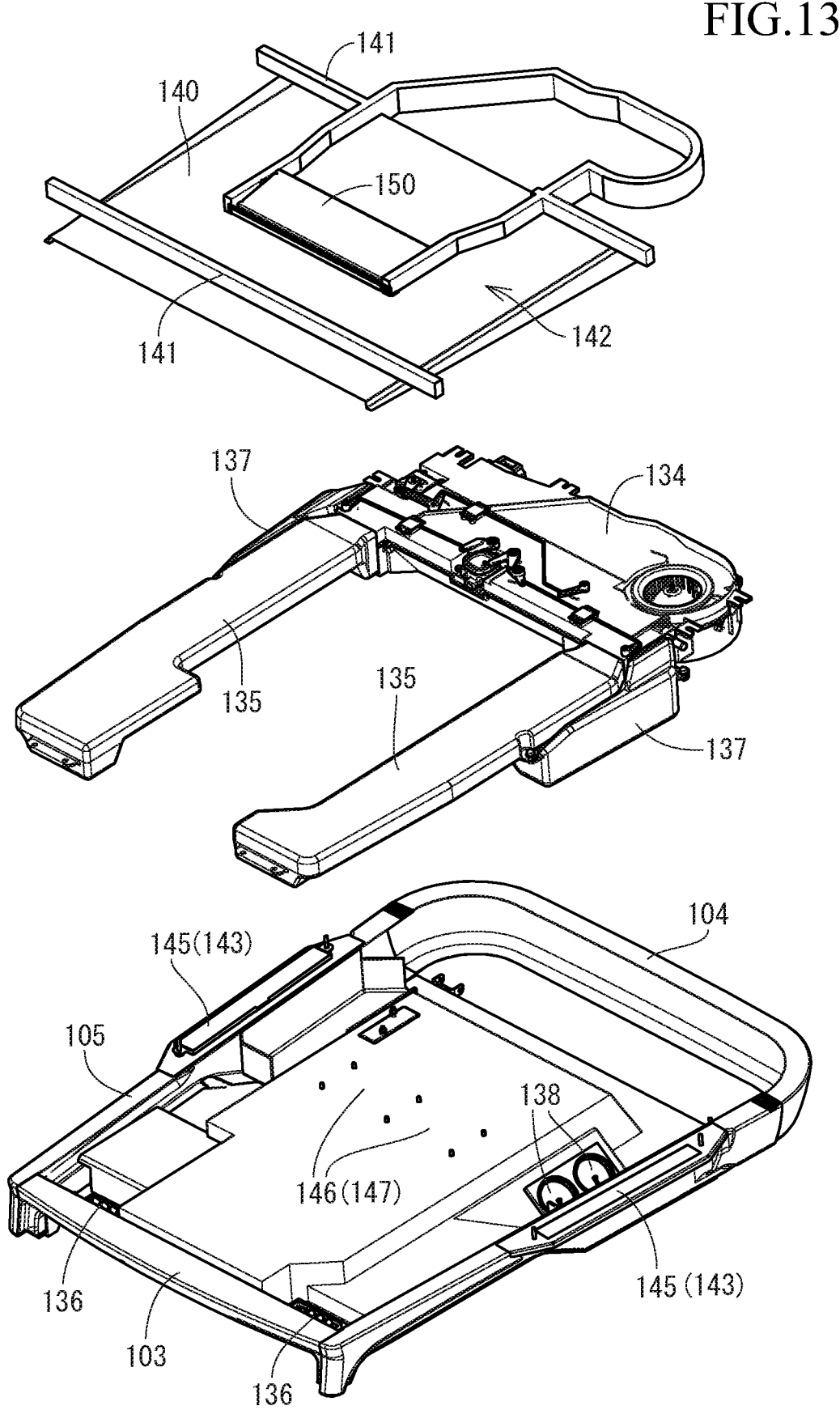
FIG. 13 is an exploded front perspective view of an inner structure of the roof body, as viewed from a left upper side.
Figure 14:
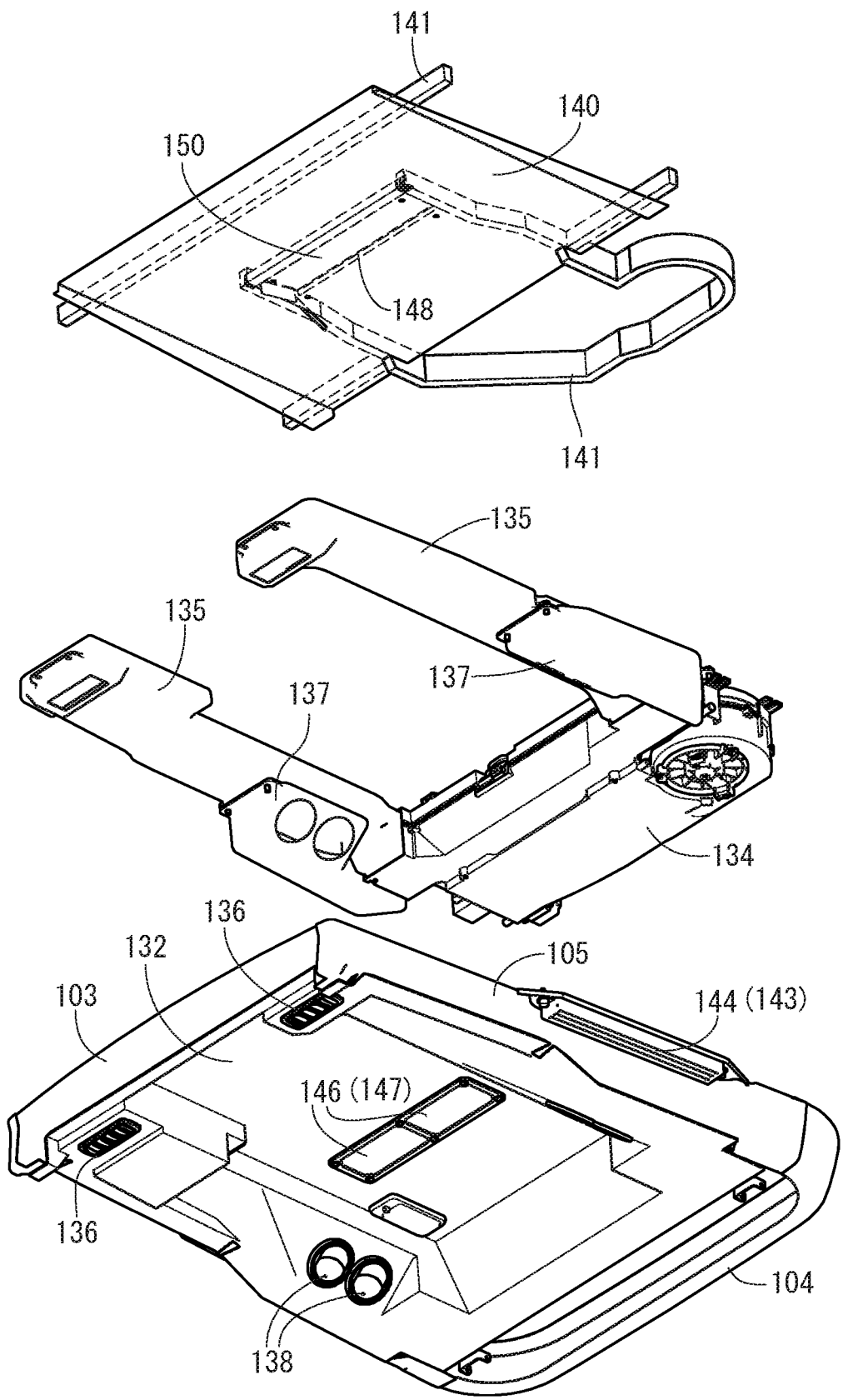
FIG. 14 is an exploded rear perspective view of the inner structure of the roof body, as viewed from a left lower side.

As illustrated in FIGS. 9 and 10, the seat frame body 109, which supports the operator's seat 8, includes a rear intermediate beam member 112 and a pair of left and right rear lower frames 113. The rear intermediate beam member 112 extends in parallel to the reinforcement beam 111. The rear lower frames 113 extend downward from the rear intermediate beam member 112. The rear intermediate beam member 112 is located between lower end portions of the left and right rear pillars 102. Left and right end portions of the rear intermediate beam member 112 are respectively coupled to lower end sides of the corresponding left and right rear pillars 102. The base bracket 127 is attached to a lower end side of each of the rear lower frames 113. An upper rear plate 114 and a lower rear plate 115 are disposed one above the other in an upper half portion between the left and right rear lower frames 113. Left and right end portions of the upper and lower rear plates 114 and 115 are respectively coupled to the corresponding left and right rear lower frames 113. A lower end side of the upper rear plate 114 and an upper end side of the lower rear plate 115 are coupled to each other.

A rear end side of a side frame 116 is coupled to a vertically intermediate portion of each of the rear lower frames 113. The side frame 116 is curved to expand forward and upward in a side view to fit a shape of the rear fender 21. The corresponding left and right rear fenders 21 are coupled to the side frames 116. A corner cover plate 117 is disposed between corner portions of the left and right side frames 116. Left and right end portions of the corner cover plate 117 are respectively coupled to left and right inner surface sides of the corresponding side frames 116. A front surface cover plate 118 is disposed below the corner cover plate 117. Left and right end portions of the front surface cover plate 118 are respectively coupled to left and right inner surface sides of vertically elongated portions of the corresponding side frames 116. Seat support plates 119 elongated in the fore and aft direction protrude inward from inner surface sides of laterally elongated portions of the side frames 116. Rear end sides of the seat support plates 119 are coupled to lower end sides of the lower rear plate 115. Front end sides of the seat support plates 119 are coupled to rear sides of upper ends of the corner cover plate 117.

The components 112 to 119 of the seat frame body 109 are all made of metal (steel). As illustrated in FIGS. 9 and 10, the side frames 116, which constitute left and right side portions of the seat frame body 109, are formed to have an uneven cross-section by presswork. Similarly, the upper and lower rear plates 114 and 115, which constitute a rear portion of the seat frame body 109, are formed to have an uneven cross-section by presswork. The left and right side frames 116 and the upper and lower rear plates 114 and 115, which have uneven cross-sections, are coupled to each other through the left and right rear lower frames 113. With this configuration, a section modulus of the left and right side frames 116 of the seat frame body 109 is increased to improve rigidity of the seat frame body 109 and rigidity of the cabin frame 100 in consequence. A bottom frame elongated in the fore and aft direction, which has been used conventionally, is no longer necessary. The upper and lower rear plates 114 and 115 of the seat frame body 109 are formed to have an uneven cross-section by presswork, and the left and right side frames 116 are coupled to the upper and lower rear plates 114 and 115 through the left and right rear lower frames 113. This further improves the section modulus of the seat frame body 109 as a whole and makes it possible to constitute a structure solely by the seat frame body 109. This in turn contributes to improvement of rigidity of the whole cabin frame 100.

Next, by referring to FIGS. 11 to 14, an air conditioning configuration of the roof body 106 will be described. The roof body 106, which is attached to the upper end side of the cabin frame 100, includes an outer roof 131 and an inner roof 132. The outer roof 131 is an exterior component. The inner roof 132 constitutes a ceiling of the cabin 7. The inner roof 132 and the front, rear, left, and right beams 103 to 105 are covered with the outer roof 131 from above to make the inside of the roof body 106 hollow. Therefore, a rear side of the outer roof 131 extends more rearward than both of the left and right rear pillars and covers as far as the rear beam 104.

An air conditioner 134 to control air conditioning in the cabin 7 is accommodated in a rear portion inside of the roof body 106. The air conditioner 134 controls air conditioning (room temperature) in the cabin 7 by heating utilizing a coolant of the engine 5 and cooling utilizing a compressor, a capacitor, and an evaporator, for example, driven by the engine 5. The air conditioner 134 of the embodiment is partially fitted in an inner surface side (in the opening) of the rear beam 104 that protrudes more rearward than the left and right rear pillars 102. This prevents an overall height of the cabin 7 from becoming larger than necessary and reduces an installation space of the air conditioner 134. In the embodiment, the rear beam 104 and the reinforcement beam 111, which have a rectangular frame shape in a plan view, support the air conditioner 134.

In both of left and right corner portions of a front surface of the air conditioner 134, first air discharge holes and second air discharge holes (both not illustrated) are formed. The first air discharge holes are opened forward. The second air discharge holes are opened outward to the left and right. An upstream side of first discharge ducts 135 is connected to the left and right first air discharge holes. The first discharge ducts 135 elongated in the fore and aft direction guides conditioned air from the air conditioner 134. A downstream side of the first discharge ducts 135 is connected to defogging blowoff holes 136 formed in a front portion of the inner roof 132. The defogging blowoff holes 136 include fins to change and control an amount and a direction of the conditioned air from the air conditioner 134.

An upstream side of second discharge ducts 137 to guide the conditioned air from the air conditioner 134 is connected to the left and right second air discharge holes. The left and right second discharge ducts 137 are shorter than the first discharge ducts 135 but extend forward. Downstream sides of the second discharge ducts 137 extend beneath the corresponding first discharge ducts 135. The downstream sides of the second discharge ducts 137 are connected to cooling-heating blowoff holes 138 formed in left and right side portions of the inner roof 132. In a similar manner to the defogging blowoff holes 136, the cooling-heating blowoff holes 138 include fins to change and control an amount and a direction of the conditioned air from the air conditioner 134. Consequently, in left and right side portions in the roof body 106, the pairs of the first and second discharge ducts 135 and 137 are separately disposed.

A partition plate 140 is disposed in an intermediate portion inside of the roof body 106 in the fore and aft direction and extends over both of the left and right first and second discharge ducts 135 and 137. Seal materials 141 are attached on the partition plate 140 and the air conditioner 134 to form an approximately T-shaped passage in a plan view toward the air conditioner 134. With the inner roof 132 being covered with the outer roof 131, the seal materials 141 are in close contact with an inner surface side of the outer roof 131 so as to form the approximately T-shaped passage in a plan view on the partition plate 140 inside of the roof body 106. This passage constitutes an intake duct 142 to take in outside air.

Intermediate portions of the left and right side beams 105 in the fore and aft direction expand outward to the left and right. Outside air intake holes 143 are formed in these expanding portions to allow the intake duct 142 to communicate with the outside. Upstream opening sides of the intake duct 142 that face outward to the left and right respectively communicate with the left and right outside air intake holes 143. A louver-shape ventilation frame 144 and a dedusting filter 145 (outside air filter) are attached to the outside air intake hole 143. Consequently, in the embodiment illustrated in FIGS. 11 to 14, the left and right first and second discharge ducts 135 and 137 and the approximately T-shaped intake duct 142 in a plan view are separately arranged in upper and lower portions inside of the roof body 106. The left and right first and second discharge ducts 135 and 137 discharge the conditioned air from the air conditioner 134 into the cabin 7. The approximately T-shaped intake duct 142 in a plan view takes in the outside air.

Meanwhile, inside air intake holes 146 to allow the inside of the roof body 106 and the inside of the cabin 7 to communicate with each other are formed in a central portion of the inner roof 132. A gridlike ventilation frame 147 is attached to the inside air intake hole 146. A communication hole 148 to communicate with the inside air intake holes 146 is opened in a portion of the partition plate 140 at a position corresponding to an intersecting portion of the T shape of the intake duct 142. An inside air-outside air switch shutter plate 150 is disposed at the communication hole 148 in the partition plate 140 so as to manually open and close the communication hole 148.

When the inside air-outside air switch shutter plate 150 is closed, the inside air intake holes 146 and the communication hole 148 are closed, and the air conditioner 134 is driven to guide the outside air from the left and right outside air intake holes 143 through the intake duct 142. When the inside air-outside air switch shutter plate 150 is opened, the inside air intake holes 146 and the communication hole 148 are opened to stop intake of the outside air from the left and right outside air intake holes 143. The air conditioner 134 is driven to guide the air in the cabin 7 into the air conditioner 134 from the inside air intake holes 146. In the embodiment, a ratio of the outside air and the inside air guided to the air conditioner 134 is adjusted by an opening degree of the inside air-outside air switch shutter plate 150.

As obviously understood from the above description and FIGS. 7, 8, and 11 to 14, in the work vehicle including the cabin 7 to cover the operator's seat 8 on the traveling body 2, the cabin frame 100, which constitutes the framework of the cabin 7, includes the pair of left and right front pillars 101, the pair of left and right rear pillars 102, the front beam 103, the rear beam 104, and the side beams 105. The front beam 103 couples the upper end portions of the front pillars 101 to each other. The rear beam 104 couples the upper end portions of the rear pillars 105 to each other. Each of the side beams 105 couples to each other the upper end portions of each of the front pillars 101 and each of the rear pillars 102 that stand at the front and rear. The rear beam 104 protrudes more rearward than both of the rear pillars 102 to accommodate the air conditioner 134 inside of the rear beam 104. Consequently, without increasing an overall height of the cabin 7, the air conditioner 134 can be disposed inside of the roof body 106. It is also possible to avoid a problem that if the air conditioner 134 is accommodated at the front side of the roof body 106, for example, the air conditioner 134 may block the operator's front field of vision. Moreover, since the air conditioner 134 is accommodated inside of the rear beam 104, it is possible to reduce an installation space of the air conditioner 134.

The rear beam 104 is formed to have a U-shaped cross section by presswork of a metal plate material. This improves rigidity of the rear beam 104 without using a pipe material, for example, and also reduces a weight of the rear beam 104.

As obviously understood from the above description and FIGS. 11 to 14, in the work vehicle including the cabin 7 to cover the operator's seat 8 on the traveling body 2, the cabin 7 includes the cabin frame 100 and the roof body 106. The cabin frame 100 constitutes the framework. The roof body 106 is disposed on the upper end side of the cabin frame 100. The air conditioner 134 is accommodated in the rear side of the roof body 106. The left and right pairs of discharge ducts 135 and 137 to discharge the conditioned air from the air conditioner 134 into the cabin 7 are separately disposed respectively on the left and right side portions of the roof body 106. Consequently, the air conditioner 134, which is located at the rear, provides a larger space in a front upper portion of the cabin 7. This improves front visibility of the cabin 7. Since a space is provided at the front of the roof body 106, an installation position of a sunroof, for example, can be readily secured.

Inside of the roof body 106, the intake duct 142 is disposed above both of the discharge ducts 135 and 137. The outside air intake holes 143 to allow the intake duct 142 to communicate with the outside are formed in both of the left and right side portions of the roof body 106. The outside air filters 145 are attached to the outside air intake holes 143. Consequently, the discharge ducts and the intake duct are disposed one above the other to save space. The left and right side portions of the roof body, which are dead space, are utilized effectively to dispose the outside air filters in compact arrangement.

As obviously understood from the above description and FIGS. 11 to 14, in the work vehicle including the cabin 7 to cover the operator's seat 8 on the traveling body 2, the cabin 7 includes the cabin frame 100 and the roof body 106. The cabin frame 100 constitutes the framework. The roof body 106 is disposed on the upper end side of the cabin frame 100. The air conditioner 134 is accommodated in the roof body 106. The discharge ducts 135 and 137 to discharge the conditioned air from the air conditioner 134 into the cabin 7 and the intake duct 142 to take in the outside air are separately disposed in the upper and lower inside portions of the roof body 106. Consequently, the discharge ducts 135 and 137 and the intake duct 142 are arranged at two upper and lower stages to reduce a space for installing a group of the ducts 135, 137, and 142 inside of the roof body 106.

As obviously understood from the above description and FIGS. 7 to 10, in the work vehicle including the cabin 7 to cover the operator's seat 8 on the traveling body 2, of the cabin frame 100 which constitutes the framework of the cabin 7, the left and right side portions 116 of the seat frame body 109 that supports the operator's seat 8 are formed to have an uneven cross-section by presswork. This increases the modulus of section of the left and right side portions 116 of the seat frame body 109 to improve rigidity of the seat frame body 109 and thus rigidity of the cabin frame 100. A conventional pipe frame extending in the fore and aft direction is no longer necessary.

Moreover, the rear surface portions 114 and 115 of the seat frame body 109 are formed to have an uneven cross-section by presswork, and the left and right side portions 116 are coupled to the rear surface portions 114 and 115. This increases the modulus of section of the seat frame body 109 as a whole, and the seat frame body 109 can solely constitute a structure. This in turn contributes to improvement of rigidity of the whole cabin frame 100.

It is noted that configurations of the components in the present invention should not be limited to the embodiment illustrated in the drawings, and that various modifications are possible without departing from the spirit of the present invention.

The embodiments of the present invention relates to a work vehicle such as a tractor for farm work or a wheel loader for construction work.

The invention claimed is:

1. A work vehicle comprising:
a cabin comprising a cabin frame that constitutes a framework of the cabin, the cabin frame comprising:
  a plurality of pillars comprising:
    a left front pillar;
    a right front pillar;
    a left rear pillar; and
    a right rear pillar; and
  a plurality of beams each coupling multiple pillars of the plurality of pillars, the plurality of beams include:
    a first beam;
    a second beam positioned forward of the first beam;
    a fourth beam that extends between the second beam and the first beam; and
    a fifth beam that extends between the second beam and the first beam; and
  an intake duct configured to take in outside air, the intake duct in communication with outside air via a first aperture defined in the fourth beam and a second aperture defined in the fifth beam;
wherein:
  a first portion of the first beam of the plurality of beams protrudes rearward from the left and right rear pillars;
  at least a first portion of a housing of an air conditioner of an air conditioner system is accommodated inside of the first portion;
  a second portion of the housing of the air conditioner is positioned forward of the left rear pillar or the right rear pillar; and
  the air conditioner system includes the air conditioner and one or more ducts coupled to the housing of the air conditioner, the one or more ducts distinct from the housing of the air conditioner.

2. The work vehicle according to claim 1, wherein:
the plurality of beams include a third beam that extends between the left and right rear pillars;
the third beam is positioned forward of the first portion of the first beam; and
the first beam and the third beam are arranged to form a rectangular shape in a plan view.

3. The work vehicle according to claim 2, wherein the second beam, the third beam, the fourth beam, and the fifth beam are arranged to form a rectangular shape in the plan view.

4. The work vehicle according to claim 3, further comprising:
a roof body coupled to the cabin frame, the roof body defining a chamber and comprising a left discharge duct and a right discharge duct disposed separately on left and right side portions of the chamber; and
wherein:
  the left and right discharge ducts are configured to discharge conditioned air from the air conditioner into the cabin; and
  the intake duct and the left and right discharge ducts are separately arranged in upper and lower portions of the chamber.

5. The work vehicle according to claim 4, wherein the intake duct is disposed above both the left and right discharge ducts within the chamber.

6. The work vehicle according to claim 5, further comprising:
one or more outside air filters coupled to the first and second aperture; or
the housing of the air conditioner that is positioned in the chamber rearward of the intake duct and the left and right discharge ducts.

7. The work vehicle according to claim 5, wherein:
the roof body comprises:
  an inner roof that defines a ceiling of the cabin; and
  an outer roof that defines an exterior surface of the roof body; and
the inner roof and the outer roof cooperate to define the chamber.

8. The work vehicle according to claim 7, wherein:
the inner roof and the first beam define an opening and the at least a portion of the air conditioner is positioned above the opening; and
the outer roof extends rearward of the left and right rear pillars to cover the opening.

9. A work vehicle comprising:
a cabin comprising a cabin frame that constitutes a framework of the cabin, the cabin frame comprising:
  a plurality of pillars comprising:
    a left front pillar;
    a right front pillar;
    a left rear pillar; and
    a right rear pillar; and
  a plurality of beams each coupling multiple pillars of the plurality of pillars, the plurality of pillars including:
    a first beam;
    a second beam that extends between the left front pillar and the left rear pillar; and
    a third beam that extends between the right front pillar and the right rear pillar; and
  an intake duct configured to take in outside air, the intake duct in communication with outside air via a first aperture defined in the second beam and a second aperture defined in the third beam, and
wherein:
  a first portion of a first beam of the plurality of beams protrudes rearward from the left and right rear pillars; and
  at least a portion of an air conditioner is accommodated inside of the first portion.

10. The work vehicle according to claim 9, wherein the air conditioner comprises a compressor, a capacitor, an evaporator, or a combination thereof.

* * * * *